(12) United States Patent
Langton

(10) Patent No.: US 6,553,481 B1
(45) Date of Patent: Apr. 22, 2003

(54) SYSTEM AND METHOD FOR SMART CARD WITH MEMORY

(75) Inventor: Philip Sydney Langton, Santa Cruz, CA (US)

(73) Assignee: Swapcard.com Inc., Santa Cruz, CA (US)

( * ) Notice: Subject to any disclaimer, the term of this patent is extended or adjusted under 35 U.S.C. 154(b) by 0 days.

(21) Appl. No.: 09/551,735

(22) Filed: Apr. 18, 2000

(51) Int. Cl.[7] ............................................... G06F 15/00
(52) U.S. Cl. ........................................ 712/37; 713/600
(58) Field of Search ........................... 713/600; 710/52; 711/100, 101; 712/1, 32, 36, 37

(56) References Cited

U.S. PATENT DOCUMENTS 5,825,706 A * 10/1998 Snowden et al. ........... 365/222
6,216,015 B1 * 4/2001 Hymel ........................ 455/558
6,434,403 B1 * 8/2002 Ausems et al. ............. 455/556

* cited by examiner

*Primary Examiner*—Thomas M. Heckler
(74) *Attorney, Agent, or Firm*—H. Black P.E.

(57) ABSTRACT

A system method and computer program for smart card with memory is disclosed. A very low cost approach two embodiment is disclosed, making use of a microcontroller with a FLASH memory or a WORM memory. An approach two programming a flash memory under the control of instructions within that memory itself is disclosed.

Utilizing the invention it is possible to build smart cards at a low cost them heretofore.

18 Claims, 3 Drawing Sheets

SYSTEM AND METHOD FOR SMART CARD WITH MEMORY

FIELD OF THE INVENTION

The present invention relates generally to handheld computers and smart cards. In particular the invention relates to low cost, low-power computerized cards with writeable memory.

BACKGROUND OF THE INVENTION

A computerized smart card is typically a cuboid enclosure with dimensions on the order of 100 mm×40 mm×5 mm of a resilient plastic material that includes a semiconductor chip capable of holding data and typically capable of supporting multiple user applications.

Physically, a smart card often resembles the commonplace credit card but having one or more semiconductor devices attached to a module embedded in the card, providing communication with the outside world typically, though not necessarily, via electrical contacts.

Though usage is commonplace, handheld computers and smart cards have been too expensive for ubiquitous use. A number of problems exist in reducing the cost of these to a minimum. Moreover, smart cards that implement any form of wireless (radio, optical, audio etc.) communication tend to be expensive and include some form of computer—typically a microcontroller. Low cost microcontrollers are well known in the art.

A bare minimum useful wireless handheld computer (or smart card) will comprise an enclosure, a electrical energy source, programmable microprocessor or microcontroller of some form, together with memory, operator controls, a wireless means for data input and a wireless means for data output. When a bare-bones handheld computer is designed for lowest possible cost, consistent with at least a minimal usefulness, it becomes apparent that the need for a microprocessor or microcontroller together with memory constitute a significant proportion of the total cost. Therefore it is desirable to use the cheapest possible microcontroller part (with on-board memory), consistent with energy constraints.

A minimally useful handheld computer will require three classes of memory:

1. A non-volatile, readable memory for storage of program codes and unchanging data. This memory may be, but need not be, a read-only memory (ROM).
2. A non-volatile, read/write memory for storage of data.
3. A read/write scratch pad memory with an effectively unlimited cycle life.

Various memory technologies are available, and indeed a battery backed complementary metal oxide semiconductor (CMOS) memory might meet the requirements of all three memory classes supra. However lower cost approaches are possible and such a "battery-CMOS" device would need to be continuously energized.

Generally scratch pad memory is included with all microcontrollers, so is not a crucial design constraint in the present context.

Certain very low cost microcontrollers with on-board non-volatile memory at the present time provide a FLASH memory with a bulk erase feature. FLASH memories with bulk erase are well known in the art. For lowest possible cost it is desirable to use a single FLASH memory for both program codes and data. The cheapest microcontrollers with on-board FLASH memory are not primarily intended for use in such a mode. Rather the intention is that the FLASH memory shall be programmed using an external computer or programming machine of some kind and the memory shall be bulk erased with the same or a similar device. Such FLASH memory is intended to be used in a manner whereby it is erased all at once (in bulk) and then re-programmed in entirety.

Thus, a need exists for an extremely low cost smart card. Also, a need exists for a system, method and computer program product for implementing a computer system with persistent data storage implemented as a single FLASH memory.

THE SUMMARY OF THE INVENTION

Accordingly a system, method and computer program product is disclosed for implementing a computer system with persistent data storage using a single non-volatile FLASH memory.

A SwapCard (a trademark of SWAPCARD.COM Inc.) based upon an ATMEL (TM) AT89LV51 embedded microcontroller is disclosed. The AT89LV51 is a complementary metal-oxide semiconductor (CMOS) device, CMOS devices being common in the art. This microcontroller includes many features of the '8051 microcontroller family' members of which are well known in the art. This microcontroller includes 128 bytes of scratch pad memory and a single FLASH memory of(typically) 4 Kbytes. The first part of the FLASH memory is used to hold program codes and is written using an external programming computer in the factory when the SwapCard is manufactured. A second part of the FLASH memory is used to hold data and is read from and written to under the control of the program codes in the first part (i.e. the low address space) of the FLASH memory.

External to the microcontroller, programming circuitry is provided for programming an eight-bit byte into the second part of the FLASH memory. A significant constraint is that it is not possible for the microcontroller to fetch program instructions from the FLASH memory while a byte is being programmed. In fact, programming a byte of FLASH memory takes a much longer time that the typical instruction cycle time for the microcontroller. The microcontroller must be held in a reset state during programming, causing the ordinary program execution sequence to be disrupted.

Whenever programming of a byte to FLASH memory is completed the SwapCard (TM) circuitry external to the microcontroller releases the microcontroller RESET control wire and the firmware must recover its context. For cost reasons, no non-volatile memory is made available to store the context across data programming cycles. Thus, the firmware must recover its context from using a resource external to the SwapCard. One external source disclosed is a co-operating computer with which the SwapCard is in wireless communication.

DETAILED DESCRIPTION OF A PREFERRED EMBODIMENT

The following description is presented to enable a person of ordinary skill in the art to make and to use the invention and is provided in the context of a patent application and its requirements. Various modifications to the embodiment disclosed will be readily apparent to those skilled in the art and the general principles herein may be applied to other embodiments. Thus, a present invention includes, but is not intended to be limited to the embodiment shown. It is to be accorded the widest scope consistent with the principles and features described herein.

Figure 1:
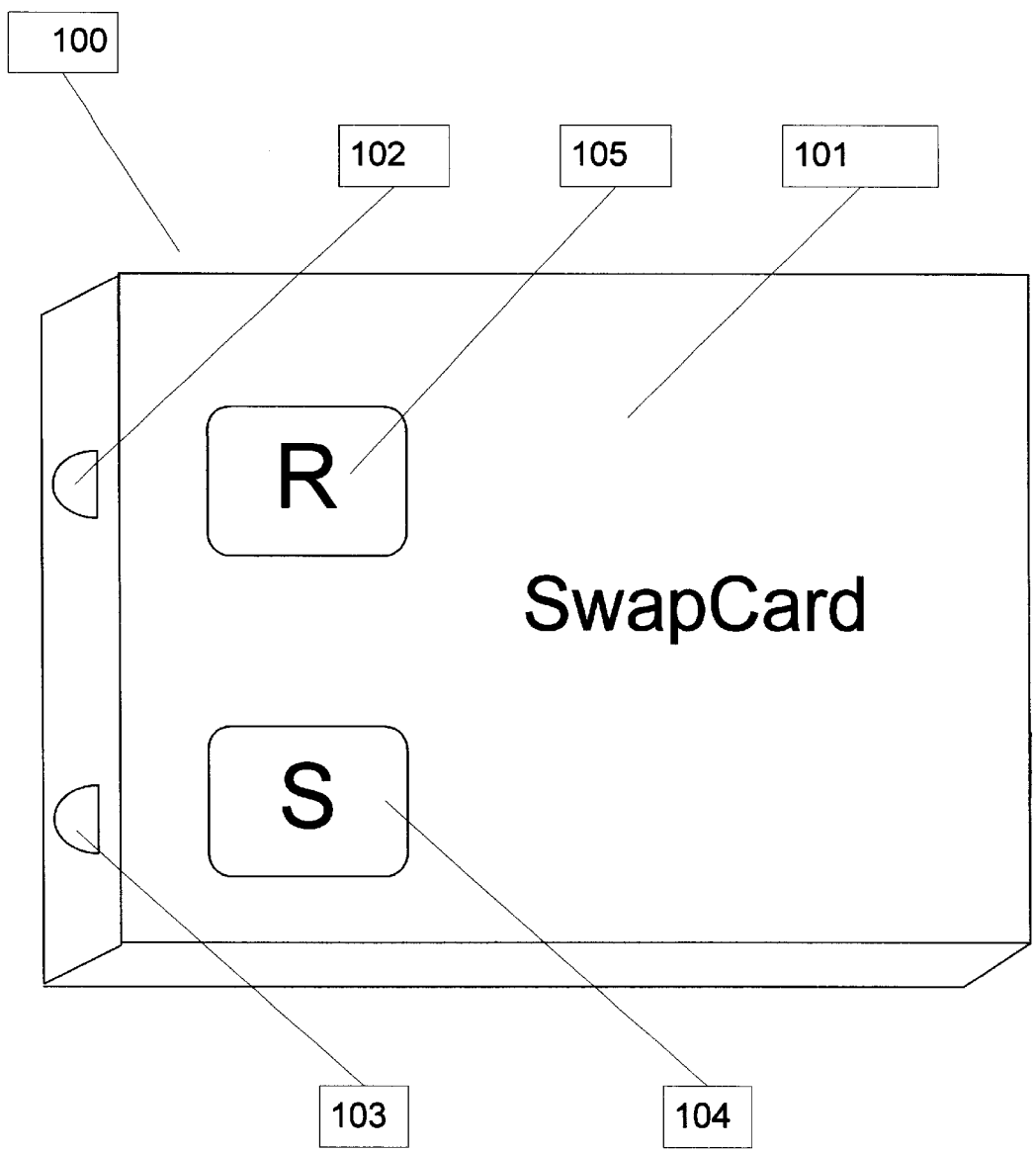
FIG. 1 is an illustration of a SwapCard (TM).

FIG. 1 shows a SwapCard (TM) 100 which is a computerized smart card implemented according to the present invention. The salient features include an enclosure 101, an infrared (IR) detector 102, an IR emitter 103, a "Send" pushbutton 104, and a "Receive" pushbutton 105. The SwapCard is dimensioned to fit comfortably in a human hand. Although a preferred embodiment, the use of IR devices is not crucial to the invention and other wireless means, e.g. optical, audio or radio communication devices, could be used within the general scope of the invention.

Figure 2:
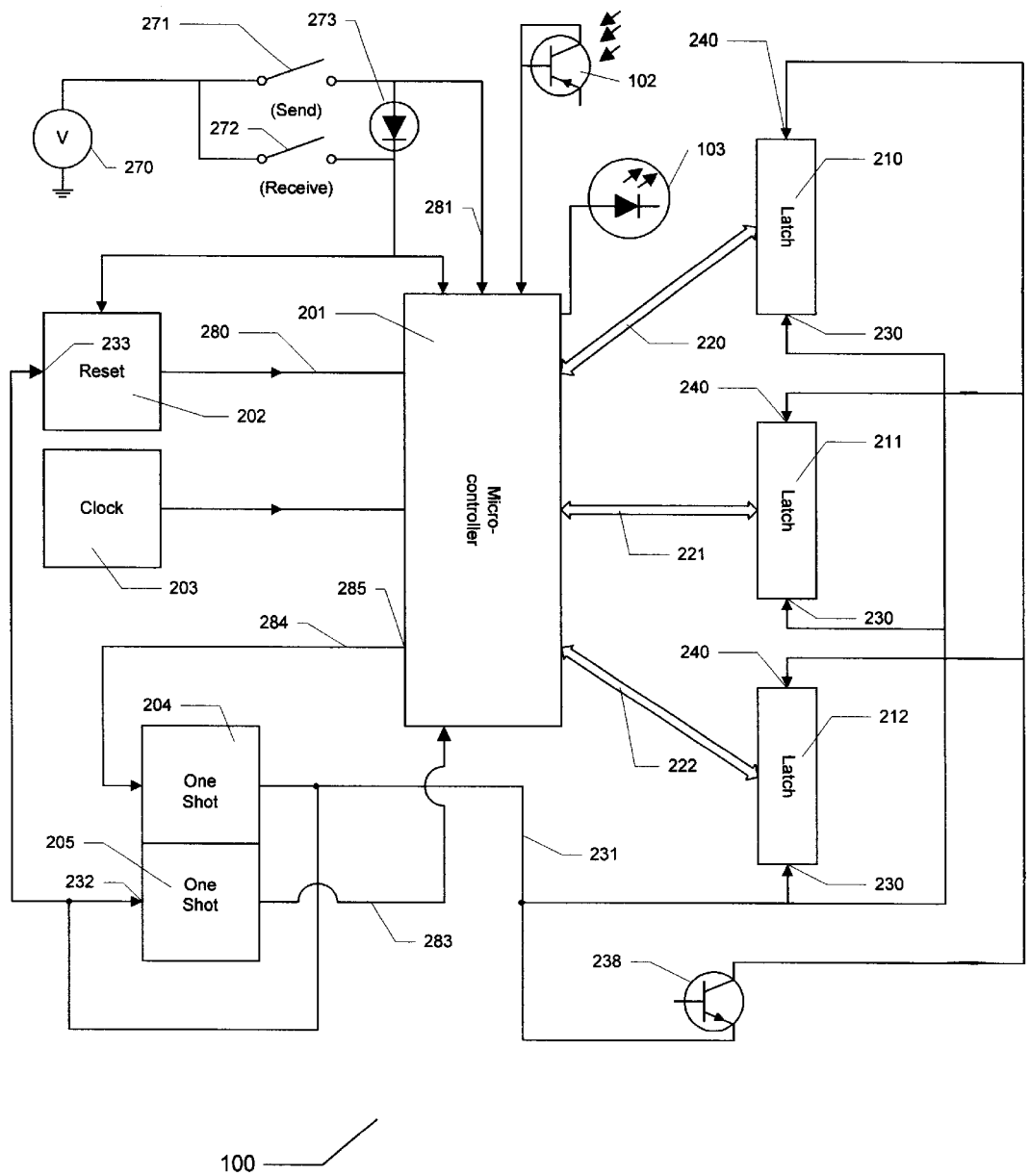
FIG. 2 is a block diagram of a SwapCard (TM) embodying the present invention.

FIG. 2 shows a simplified block diagram of the SwapCard (TM) 100. The SwapCard (TM) comprises a microcontroller 201 together with a reset control circuit 202, a clock generator 203, a pair of monostable one-shots 204 and 205. The microcontroller 201 is an ATMEL (TM) AT89LV51 complementary metal-oxide semiconductor (CMOS) embedded microcontroller that is a low voltage, low power device which includes scratchpad memory and (typically) 4 Kbytes of bulk-erasable FLASH memory (not shown separately).

Still referring to FIG. 2, further circuitry includes three tri-state latches 210, 211, 212, an IR detector 102, and an IR emitter 103. A single low cost electrochemical cell 270 provides a direct current (DC) energy source that is connected to the microcontroller by either a "Send" switch 271 or a "Receive" switch 272. "Send" switch 271 and "Receive" switch 272 may be embodied as pushbuttons 104, 105 (FIG. 1). Referring again to FIG. 2, a diode 273 is also provided. Electrochemical cells are well known in the arts and there are several types are available. Primary cells such as Li-Metal-Hydride cells are available, as are secondary (i.e. rechargeable) cells such as Nickel Cadmium cells. Additionally so-called Super-Caps (which are a development of the earlier a well-known electrolytic capacitors) are available; and in many respects Super-Caps perform as functional equivalents for rechargeable cells.

Also present but not shown in FIG. 2 are various resistance-capacitance (RC) delay circuits associated with the one-shots 204, 205 and with the reset circuit 202. Other components that are well known in the art will typically be present, for example a printed circuit board for supporting the components, copper device interconnects, test point connectors, pull-up resistors, glitch suppressing decoupling capacitors and, however none of these constitute a critical feature of the invention and various options are known to those of ordinary skill in the relevant arts.

Still referring to FIG. 2, the SwapCard is operated by closing one of the switches 271, 272 whilst holding the SwapCard in proximity to another device (the "host" device, not shown) that has complementary IR transmit and receive capabilities which are compatible with those of the Swap-Card. The other device may itself be another SwapCard or it may be a part of a larger computing device such as a personal computer (PC) or a computerized point-of-sale terminal (POS).

When the "Receive" switch 272 is closed, electrochemical cell 270 energizes the microcontroller 201 and also causes the reset circuit 202 to begin a power-on sequence incorporating a timed delay that is controlled primarily by an RC circuit. Presently the reset circuit 202 impresses an active signal upon the RESET line 280 which causes the microcontroller 201 to become reset. As is common in microcontrollers, a reset signal inhibits instruction execution for the duration of the signal. Similarly when the "Send" switch 271 is operated the microcontroller 201 and the reset circuit 202 are both energized, in this case via diode 273. Also however, for the "Send" switch case, an active high signal is impressed upon an input port 281 of the microcontroller 201. Power on reset circuits are old and non-critical and various other embodiments are available.

In time the reset circuit 202 deactivates (pulls low) the RESET line 280 thus allowing the firmware in the FLASH memory of microcontroller 201 to execute at a well-known "power-on reset" memory address (typically address zero). One of the first programmed actions of the firmware upon leaving the reset state is to sample input port 281 to determine which switch (271 or 272) is being pressed. The operator is required to hold the appropriate switch 271, 272 closed until the microcontroller 201 has completed its entire function whatever that might be. Typically a light emitting diode (LED) (not shown) or beeper (also not shown) is used to signal the operator so that he or she has feedback on progress and success—however such indicators are well known and not crucial to the present invention. The clock circuit 203 is also energized via a switch 271, 272; the clock signal generated becomes stable before the RESET line 280 is deactivated. Clock signals for microcontrollers are well known and may be cheaply implemented using a ceramic resonator.

As is shown (infra), executing from reset the firmware performs one of several functions as follows:

1. If the "Send" switch 271 is held closed, then the firmware fetches data from the internal FLASH memory of the microcontroller 201 and outputs that data as an asynchronous serial binary signal to the photo emitting circuit 103. The signal may be baseband or encoded, for example Manchester encoding could be advantageously used to limit very low frequency (VLF) components. Serial encoding of binary data for transmission is old in the art, and microcontrollers typically include Universal Asynchronous Receiver Transmitter (UART) circuitry to facilitate encoding and decoding. However other techniques such high-level data link control (HDLC), binary synchronous protocol (BISYNC), anisochronous shift registers, bit-banging and so on could be used in alternative embodiments.

2. The microcontroller 201 may enter a procedure for receiving serial binary data via IR detector 102 and forming that serial binary data into data bytes. This occurs when the "Receive" switch 272 is held closed.

3. The microcontroller 201 may enter a procedure for programming a byte of data into the internal FLASH memory of the microcontroller 201. This also occurs when the "Receive" switch 272 is held closed.

A design constraint is that though it is possible to write to the FLASH memory on a byte by byte basis, it is not possible to erase FLASH memory on a byte by byte basis— the whole FLASH memory space (program AND data) may be erased only during a bulk erase operation whereby the entire FLASH memory becomes erased. Thus writing a byte of data ("a programming cycle") consists of clearing certain (or all) bits within a single byte of FLASH memory, whereas an erase cycle consists of setting all bits of all bytes of the FLASH memory. It can be seen therefore that without the use of external circuitry and without erasing the firmware itself it is not usefully possible to perform an erase operation under firmware control.

Consequently when storing run-time data to the FLASH memory of the SwapCard the FLASH memory is managed as though it were a Write-Once Read-Many (WORM) memory. Techniques for managing the organization of data files within WORM memories are well-known in the relevant art.

An implementation requirement imposed by the design of the microcontroller is that the clock signal must continue running coherently and microcontroller must be held in a reset (signal on RESET wire asserted) while a byte of FLASH memory is written (programming cycle). However it is desired that the microcontroller firmware manage the writing of data bytes to the FLASH memory itself—and this is not an ordinary mode of operation for the microcontroller. Therefore the microcontroller must reinitialize itself from the reset state after each byte of data is written to FLASH memory.

As can be seen, a significant constraint is that it is impractical to use non-volatile memory within the SwapCard to retain state information across reset operations since only one byte is written to non-volatile FLASH memory per reset in low cost embodiments. A solution is for the microprocessor to recover its state information using external resources, however incorporating such resources external to the microcontroller within the SwapCard itself works against the efforts to keep manufacturing cost very low. A disclosed approach is by way of having a host computer retain and provide state information on behalf of the SwapCard.

The operation of a programming cycle to write a byte of data to the non-volatile FLASH memory will now be described:

Referring to FIG. 2, three tri-state latches 210, 211, 212 interface to the microcontroller 201 via port zero (220), port one (221),and port two (222), respectively these being multi-purpose parallel input/output (I-O) data ports of the microcontroller. Under firmware control the microcontroller 201 outputs the data byte to be written to port zero (220). The microcontroller 201 also outputs to port one (221), the low order 8 bits of address to which the data byte is to be written. Also, the microcontroller 201 outputs the high order bits of the address to which the data byte is to be written to port 2 (222); typically fewer than 8 bits are used for this purpose according to the number of bits needed to address the FLASH memory. For example a 4 Kbytes memory requires an address width of 12 bits and so four bits of port two are used for this purpose (in addition to 8 bits of port one).

Figure 3:
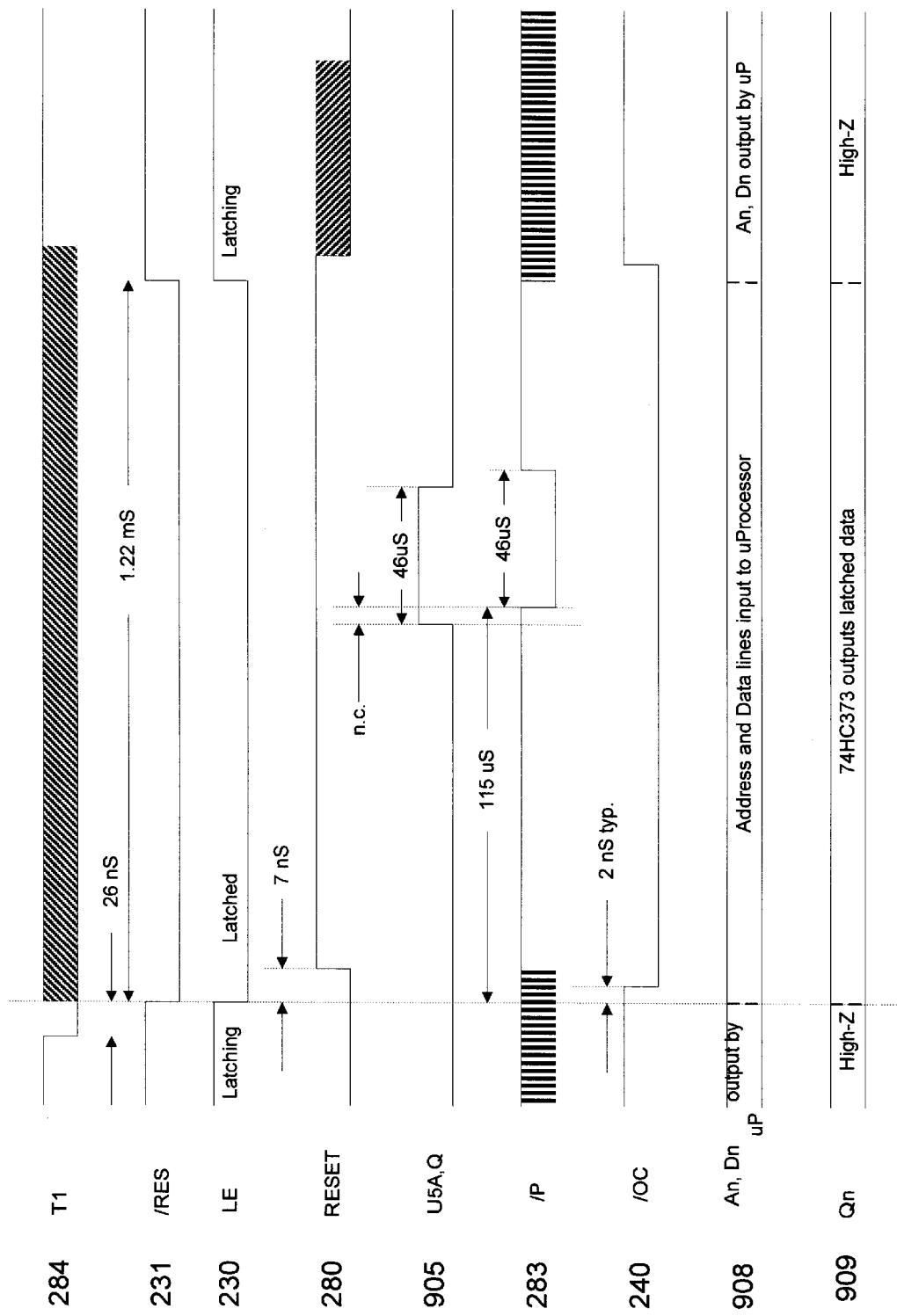
FIG. 3 is a timing diagram for signals in a preferred embodiment.

A programming cycle is initiated when, under firmware control, the microcontroller pulls the Timer One (T1) signal circuit 284 low by writing to a microcontroller one bit timer-one port 285. Referring to FIG. 3, it can be seen that T1 (284) is held in an active low state for at least approximately 26 nanoseconds, entering a "don't care" state thereafter for the duration of the programming cycle. T1 (284) is input to a one shot (204) which produces an output signal "Reset active low" (/RES) (231) which is active low for a period of about 1.22 milliseconds. The signal /RES (231) is coupled to Latch Enable (LE) signals (230) on the tri-state latches 210, 211, 212. Thus LE transitions from active (high) to inactive with the falling edge of T1 (this relationship can be clearly seen in FIG. 3).

Referring to 9, line Reference 908, it can be seen that the address and data lines output by the microprocessor (onto buses 220, 221, 222) are held valid until the falling edge of the /RES signal 230 which is applied to the Latch Enable 230 control inputs to the tri-state buffers 210, 211, 212. Thus the data and address information for programming a byte of FLASH memory become latched into the tri-state buffers 210, 211, 230.

The /RES signal 230 is also wired to the low output control signal 240 of the tri-state latches via transistor 231 which introduces a delaying of approximately 2ns as shown in FIG. 3. When the Output-Control (/OC) signals 240 (FIGS. 2 and 9) are driven low the address and data are driven as outputs 909 (FIG. 3) from the tri-state latches and are available as inputs 908 (FIG. 3) to the microprocessor.

As shown id FIG. 2, the /RES signal 230 is also wired to the input 233 of the reset circuit 202, and also to the input 232 of the one shot 205. The reset circuit 202 introduces a delay of typically 7 ns between the /RES signal 231 and the RESET signal 280, as can be seen in FIG. 3. Referring to FIG. 3 the active low programming signal /P 283 is controlled by the input 232 to the one shot 205. This signal /P is input to the microcontroller 201 and controls the internal programming operations for the FLASH memory within the microcontroller. The /P signal 283 is a low pulse of approximately 46 microseconds duration that occur is approximately 115 microseconds after the edge on the input signal 232.

During the 46 microseconds that the signal /P is held low and the microcontroller performs the internal programming operations, the byte of data is fetched from Port zero 220 and the memory address is fetched from Port one 221 and Port two 222. During this programming time RESET 280 is be held high and the clock signal remains valid and coherent.

What is claimed is:

1. A storage device comprising:
   a wireless data transmitter;
   a wireless data receiver;
   a clock circuit for generating a plurality of clock signals having a periodicity;
   a computing engine coupled to an energy source, the wireless data transmitter,
      the wireless data receiver, the clock circuit and a set of operator controls,
      the computing engine comprising a volatile memory and a non-volatile memory containing a data set, the non-volatile memory further containing a set of instruction codes,
      wherein the computing engine is powered by the energy source and
      executes instructions selected from the set of instruction codes, and
      wherein the computing engine performs an action selected from a list consisting of receiving data from the wireless data receiver and sending data to the wireless data transmitter in response to a stimulus from a control selected from the set of operator controls;
   a plurality of buffers, the buffers being external to the computing engine;
   a reset circuit coupled to the computing engine for initializing the computing engine; and
   a programming circuit coupled to the computing engine for writing to the data set in response to a signal from the computing engine and according to the contents of the plurality of buffers
      wherein the programming circuit holds the computing engine in a reset state for a duration exceeding about eight periods of the clock signals while data is being written to the data set.

2. The device of claim 1 wherein the energy source consists essentially of at least one electrochemical cell.

3. The device of claim 2 wherein the at least one electrochemical cell comprises a primary cell.

4. The device of claim 1 wherein the non-volatile memory is a FLASH memory.

5. The device of claim 1 wherein the non-volatile memory is a WORM memory.

6. The device of claim 1 wherein the non-volatile memory is an EPROM memory.

7. The device of claim 1 wherein the non-volatile memory is an PROM memory.

8. The device of claim 1 wherein the wireless data transmitter is an infrared device and wireless data receiver is a further infrared device.

9. The device of claim 1 wherein
the set of operator controls comprises a switch wherein operation of the switch energizes the microcontroller and signals the microcontroller to perform an action selected from a list consisting of sending data via the wireless transmitter and receiving data via the wireless receiver.

10. A storage device consisting essentially of:
an energy source consisting essentially of at least one electrochemical cell;
a wireless data transmitter;
a wireless data receiver;
a clock circuit for generating a plurality of clock signals having a periodicity;
a computing engine coupled to the energy source, the wireless data transmitter,
the wireless data receiver, the clock circuit and a set of operator controls,
the computing engine comprising a volatile memory and a non-volatile memory containing a data set, the non-volatile memory further containing a set of instruction codes,
wherein the computing engine is powered by the energy source and executes instructions selected from the set of instruction codes, and
wherein the computing engine performs an action selected from a list consisting of receiving data from the wireless data receiver and sending data to the wireless data transmitter in response to a stimulus from a control selected from the set of operator controls;
a plurality of buffers, the buffers being external to the computing engine;
a reset circuit coupled to the computing engine for initializing the computing engine; and
a programming circuit coupled to the computing engine for writing to the data set in response to a signal from the computing engine and according to the contents of the plurality of buffers
wherein the programming circuit holds the computing engine in a reset state for a duration exceeding about eight periods of the clock signals while data is being written to the data set.

11. The device of claim 10 wherein the non-volatile memory is a FLASH memory.

12. The device of claim 10 wherein the non-volatile memory is a WORM memory.

13. The device of claim 10 wherein the non-volatile memory is an EPROM memory.

14. The device of claim 10 wherein the non-volatile memory is an PROM memory.

15. The device of claim 10 wherein the energy source is a single electrochemical cell.

16. The device of claim 10 wherein the wireless data transmitter is an infrared device and wireless data receiver is a further infrared device.

17. A storage device consisting essentially of:
an energy source consisting essentially of at least one electrochemical cell;
a wireless data transmitter;
a wireless data receiver;
a set of operator controls comprising at least one switch;
a clock circuit for generating a plurality of clock signals having a periodicity;
a computing engine coupled to the energy source, the wireless data transmitter,
the wireless data receiver, the clock circuit and the set of operator controls,
the computing engine comprising a volatile memory and a non-volatile memory containing a data set, the non-volatile memory further containing a set of instruction codes,
wherein the computing engine is powered by the energy source and executes instructions selected from the set of instruction codes, and
wherein the computing engine performs an action selected from a list consisting of receiving data from the wireless data receiver and sending data to the wireless data transmitter in response to a stimulus from a control selected from the set of operator controls;
a plurality of buffers, the buffers being external to the computing engine;
a reset circuit coupled to the computing engine for initializing the computing engine; and
a programming circuit coupled to the computing engine for writing to the data set in response to a signal from the computing engine and according to the contents of the plurality of buffers
wherein the programming circuit holds the computing engine in a reset state for a duration exceeding about eight periods of the clock signals while data is being written to the data set.

18. The device of claim 17 wherein the operator controls comprise a first switch and a second switch, wherein operation of the first switch energizes the microcontroller and signals the microcontroller to send data via the wireless transmitter and wherein operation of the second switch energizes the microcontroller and signals the microcontroller to receive data via the wireless receiver.

* * * * *